United States Patent [19]
Albrecht

[11] Patent Number: 5,170,672
[45] Date of Patent: Dec. 15, 1992

[54] FLUID VELOCITY MEASUREMENT DEVICE FOR A GENERATING BANK TUBE

[75] Inventor: Melvin J. Albrecht, Homeworth, Ohio

[73] Assignee: The Babcock & Wilcox Company, New Orleans, La.

[21] Appl. No.: 569,315

[22] Filed: Aug. 17, 1990

[51] Int. Cl.$^5$ ............................ G01F 1/00; G01F 1/46
[52] U.S. Cl. ................................................. 73/861.65
[58] Field of Search ..................... 73/861.65, 155, 151

[56] References Cited

U.S. PATENT DOCUMENTS

| | | | |
|---|---|---|---|
| 948,872 | 2/1910 | Clark | 73/861.65 |
| 1,276,732 | 8/1918 | Darley | 73/861.65 |
| 1,283,084 | 10/1918 | Cole | 73/861.65 |
| 1,446,618 | 2/1923 | Darley | 73/861.65 |
| 2,986,933 | 6/1961 | Summerlin et al. | 73/861.65 |
| 3,425,280 | 2/1969 | Foster | 73/861.65 |
| 3,855,857 | 12/1974 | Claycomb | 73/151 |
| 3,889,536 | 6/1975 | Sylvester | 73/861.65 |
| 4,052,897 | 10/1977 | DeBaun | 73/861.65 |
| 4,717,159 | 1/1988 | Alston et al. | 73/861.65 |
| 4,811,599 | 3/1989 | Johnson et al. | 73/155 |
| 4,836,019 | 6/1989 | Hagen et al. | 73/861.65 |

OTHER PUBLICATIONS

Babcock & Wilcox, Publishers, "Steam/its generation and use", New York, 1975, pp. 33-38.

*Primary Examiner*—Hezron E. Williams
*Assistant Examiner*—George Dombroske
*Attorney, Agent, or Firm*—Vytas R. Matas; Robert J. Edwards; Eric Marich

[57] ABSTRACT

An apparatus for determining the fluid velocity and direction of flow in a generating bank tube attached to a drum of a boiler provides fluid to a measurement area located within the drum. In one embodiment, static and dynamic pressures of the fluid within the measurement area are determined by a pitot tube assembly located in the measurement area and sent to a pressure measuring device such as a U-tube manometer or a Bourdon gage for a direct pressure reading, or to a pressure transmitter to produce signals for processing by a calculating device. The calculating devices processes the pressure transmitter signals representative of the pressures, uses the energy equation to calculate the fluid velocity based upon these pressures, and transmits same to a display device for reading by an operator. In another embodiment, a flowmeter is used on the measurement area directly and transmits the fluid velocity to a display device.

30 Claims, 3 Drawing Sheets

ID#5,170,672

FLUID VELOCITY MEASUREMENT DEVICE FOR A GENERATING BANK TUBE

FIELD AND BACKGROUND OF THE INVENTION

The present invention relates to the field of steam generators such as those used to produce steam for electric power or for use in industrial applications and, more particularly, to a fluid velocity measurement device for measuring the fluid velocity in a generating bank tube attached to a drum of a boiler, and which is also capable of determining the direction of flow in the generating bank tube.

Conventional steam generators used in the production of steam for industrial power plants utilize what is known as a generating bank to produce steam for the industrial process or steam turbine. FIG. 1 shows a section through such a generating bank (10). The generating bank (10), as is well known in the art, generally comprises an upper steam drum (12) and a lower "mud" drum (14). Connected therebetween are a plurality of generating bank tubes (16) which are in fluidic communication with the upper steam drum (12) and lower mud drum (14). The generating bank tubes (16) are arranged in sections across the width of the steam generator so that the flow of combustion gases generated by the combustion process flow across the generating bank tubes in the direction of the arrow shown in FIG. 1. The generating bank (10) is initially filled with water such that the lower mud drum (14), the generating bank tubes (16) and approximately the lower half of the upper steam drum (12) are filled with water. The combustion gases, being at an elevated temperature with respect to the water in the generating bank (10), transfer heat to the generating bank tubes (16) while passing across the generating bank (10). The heat raises the temperature of the water and eventually begins to turn a portion of the water into steam. As shown in FIG. 1, the generating bank tubes (16) can be arranged in several groups or sections designated front, middle and rear sections (18, 20, 22). Sections (18, 20, 22) are separated by cavities (24, 26) which would normally be provided with sootblowers (not shown) used to clean the generating bank tubes (16). The generating bank tubes in section (18), being exposed to the highest temperature combustion gases, will begin to generate steam before the tubes in sections (20) and (22). The steam, having a lower density than that of the water, will begin to rise in section (18) upwards into the steam drum (12). As heating by the combustion gases continues, a naturally circulating upflow of a steam water mixture and downflow of water will begin to occur in the generating bank (10). The front section (18) will tend to flow upwards, while the rearmost section (22) will tend to flow in a downward direction. The generating bank tubes (16) comprising the center section (20) will begin to flow either upwardly or downwardly depending upon their heat absorption from the combustion gases. The fluid within the downflowing sections usually consists of subcooled water. However, some downflowing sections can operate with a two-phase mixture of steam and water. The fluid within all of the upflowing sections is a two-phase mixture of water and steam which must be separated. Separation of the steam from the water takes place in the upper steam drum (12) by means of centrifugal cyclone separators (28) and primary and secondary steam scrubbers (30, 32). The steam is discharged from the upper steam drum (12) through one or more outlet steam connections (34) for use by the industrial process or by a steam turbine (not shown). The water separated from the steam water mixture is discharged from the bottom of the centrifugal cyclone separators (28) and returned to the downflowing generating bank tubes (16).

Variations in the heat transfer across the various sections (18, 20, 22) of the generating bank (10) will cause upsets in the flow of the circulating two-phase mixture of water and steam. Further, it is theoretically possible for some of the tubes (16) in the generating bank (10) to flow in an upward direction at certain levels of the steam production and to flow in an opposite direction at other levels of steam production. In order to more fully understand this phenomena, it is necessary to investigate the flow within an individual generating bank tube (16) while the steam generator is in operation. Any apparatus for this purpose however, must take into account the environmental conditions within which the generating bank tubes (16) must operate. For example, many industrial steam generators using a two-drum generating bank (10) as shown in FIG. 1 are used in the soda or Kraft process recovery setting. In a process recovery boiler, extreme caution must be utilized to prevent the mixing of water in the generating bank (10) with the black liquor produced in the process. This is because the mixing of water and the black liquor creates a highly explosive reaction which can cause catastrophic damage to the steam generator and operating personnel. Thus, while it might be convenient to install some type of measuring device on an easily accessible portion of the generating bank tube (16), i.e., on the tube (16) but in the gas stream, such an installation might be considered dangerous in view of these concerns.

It has thus become desirable to develop an apparatus for measuring the velocity of a fluid in a generating bank tube that avoids these problems, and which can also be used to determine the direction of flow of the fluid therein.

SUMMARY OF THE INVENTION

The present invention provides an apparatus for measuring the velocity of a fluid in a generating bank tube attached at one end to a drum of a boiler. Means are provided for providing fluid to a measurement area that is in fluidic communication with the generating bank tube and the drum. This fluid providing means is secured to the drum. Means for sensing pressure of the fluid within the measurement area are provided. Finally, and as a function of the sensed fluid pressure, means are provided for determining the velocity of the fluid in the measurement area, and thus in the generating bank tube itself.

In a preferred embodiment, the apparatus is located in the lower mud drum of the generating bank. A tube having a pressure sensing device is located inside the lower mud drum, one end of which is inserted into a generating bank tube of interest. The pressure sensing device senses both static and dynamic pressures of the fluid within the tube and sends indications of these pressures to a pressure transmitter. Suitable calculating and display means are provided to extract information concerning the values of the static and dynamic pressures of the fluid and also, from these measurements, to determine the velocity and direction of flow within the tube, and thus in the generating bank tube itself.

The various features of novelty which characterize the invention are pointed out with particularity in the claims annexed to and forming a part of this disclosure. For a better understanding of the present invention and the advantages attained by its use, reference is made to the accompanying drawings and descriptive matter in which a preferred embodiment of the invention is disclosed.

DESCRIPTION OF THE PREFERRED EMBODIMENT

Figure 1:
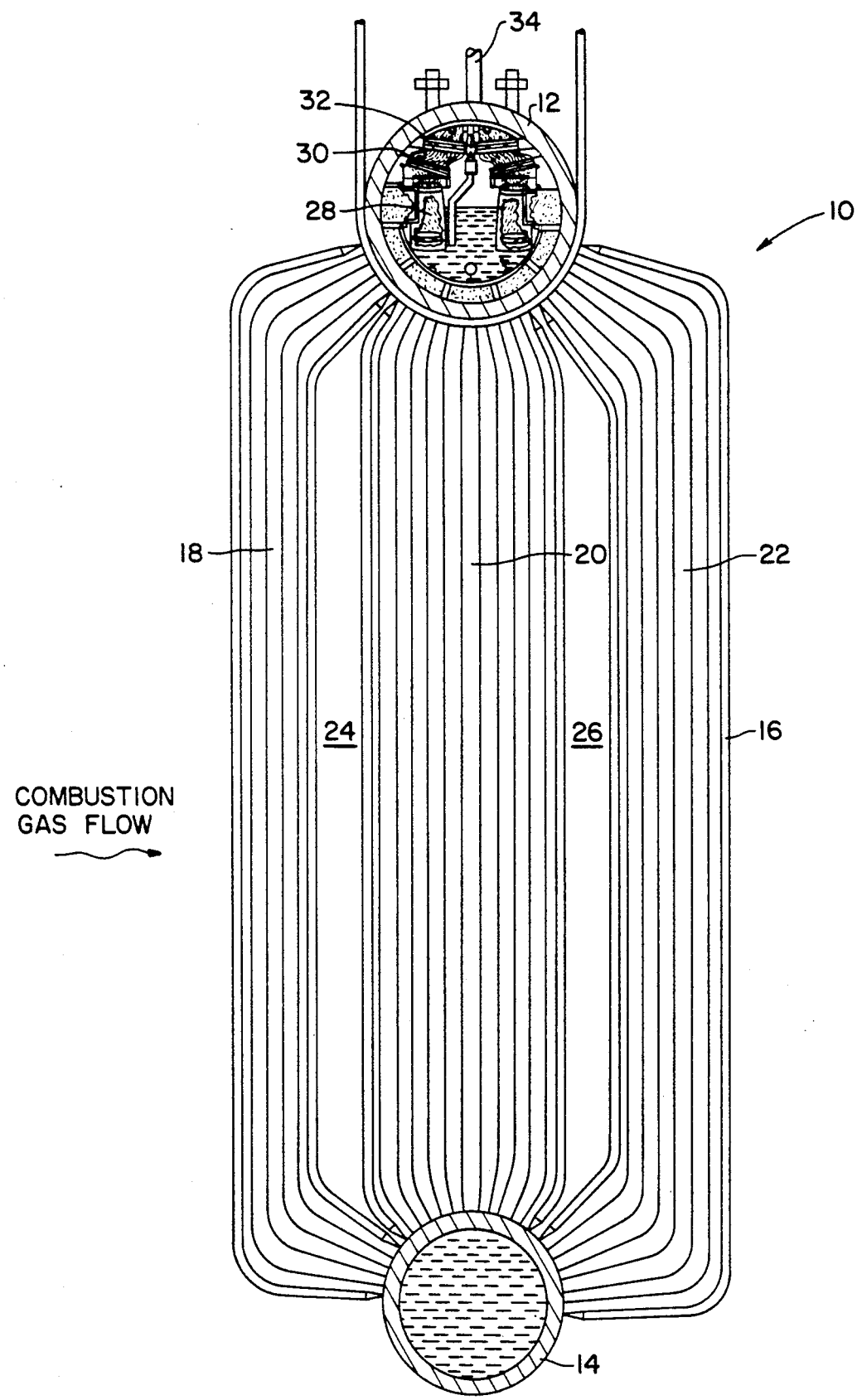
FIG. 1 is a sectional view through a generating bank of a typical two-drum steam generating bank.

The drawings provided with this disclosure are set forth to illustrate various features of the invention without limiting the scope of the invention thereto. Like numerals designate the same element throughout the several drawings. Referring to FIG. 1 in particular, there is shown a generating bank (10) fluidically connected between an upper steam drum (12) and a lower mud drum (14). The generating bank (10) is comprised of a plurality of generating bank tubes (16), arranged in first, middle and rear sections (18, 20, 22), respectively. Separating these three sections are cavities (24, 26) in which might be provided sootblowers (not shown) for cleaning the surfaces of the generating bank tubes (16). As discussed previously, the combustion gas flow across the generating bank (10) causes water contained therein to be converted into a two-phase mixture of water and steam. This two-phase mixture circulates in the generating bank tubes (16) and, referring to FIG. 1, would typically be flowing upwardly in the front section (18) and downwardly in the rear section (22). The front most generating bank tubes of section (20) would probably flow in an upwards direction while the rear most generating bank tubes of section (20) would flow in a downwards direction. The exact split of which tubes flow upwardly and which tubes flow downwardly will depend upon the heat absorption of these tubes and their thermal hydraulic performance characteristics. The two-phase water steam mixture is transported to the upper steam drum (12) where it is separated by centrifugal cyclone separators (28). The steam exits the top of the centrifugal cyclone separators (28) and passes across primary and secondary steam scrubbers (30, 32), respectively. The steam is then conveyed out of the upper steam drum (12) through a plurality of outlet steam connections (34) to the industrial process or to a steam turbine (not shown). Water separated from the two-phase mixture in the centrifugal cyclone separators (28) is returned to the generating bank tubes (16) for reheating.

The apparatus of the present invention would generally be employed in the lower mud drum (14) of such a generating bank (10) since there is generally sufficient room therein and a lack of internal equipment that would prohibit such an installation. However, it is understood that the apparatus of the present invention could also be employed in suitably large headers or other similar junction points where a plurality of tubes receive or discharge fluid.

Figure 2:
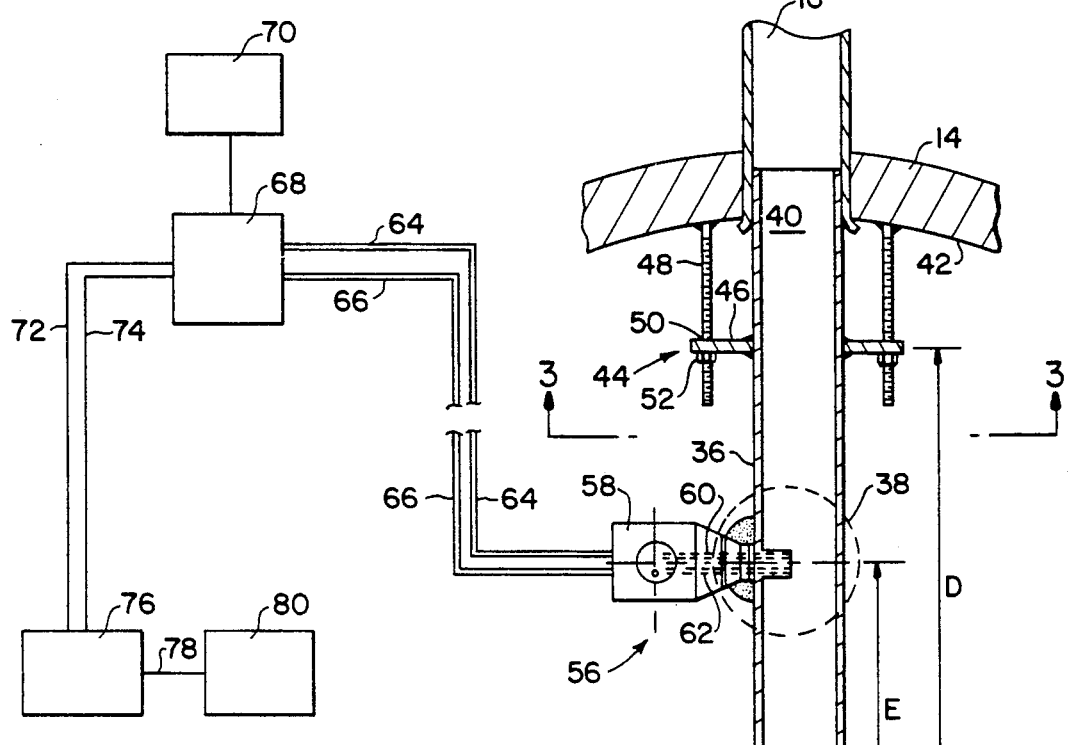
FIG. 2 is a schematic sectional view of the apparatus of the present invention as applied to an individual generating bank tube in the lower mud drum of a two-drum steam generating bank.
Figure 4:
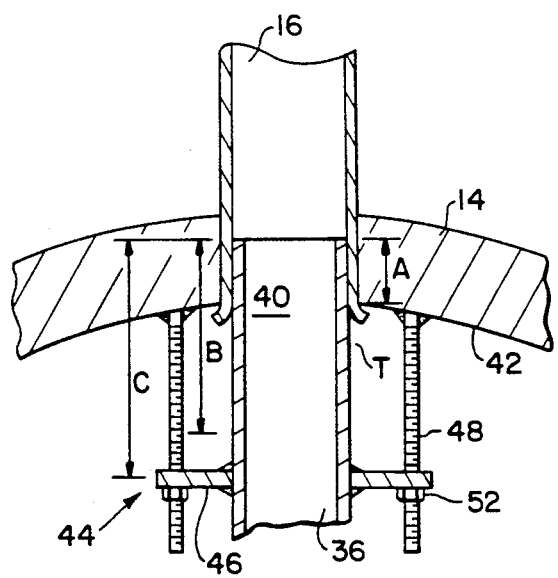
FIG. 4 is a close-up sectional view of a portion of the apparatus of the present invention as applied to an individual generating bank tube.

Referring now to FIG. 2, there is shown a schematic sectional view of the apparatus of the present invention as applied to an individual generating bank tube in the lower mud drum (14) of a two-drum steam generator. As shown therein, the generating bank tube (16) is attached at one end to the lower mud drum (14). Fluid providing means (36), advantageously a tube, are used to provide fluid to a measurement area (38) that is in fluidic communication with the generating bank tube (16) and the drum (14). A first end (40) of the tube (36) is located adjacent the one end of the generating bank tube (16) attached to the drum (14). The inside diameter (ID) of the one end of the generating bank tube (16) closely receives an outside diameter (OD) of the first end (40) of the tube (36) so as to prevent fluid passing between the ID of the one end of the generating bank tube (16) and the OD of the tube (36). In a typical installation, the ID of the generating bank tube is approximately 1.672". Preferably, the OD of the first end (40) of the tube (36) tapers radially inwardly and towards the first end (40) of the tube (36) to facilitate being closely received by the ID of the one end of the generating bank tube (16). The tapered portion T is shown in greater detail in FIG. 4. Generally, the first end (40) of the tube (36) is inserted a distance A into the one end of the generating bank tube (16). Distance A is in the range of approximately 1"–3" as measured from an inner surface (42) of the drum (14) in the vicinity of the one end of the generating bank tube (16). The amount of taper T of the OD of the first end (40) of the tube (36) is from approximately 2" OD down to approximately 1.5" OD. The tapered portion T extends for a distance B, and would generally be in the range of 3"–4", measured as shown in FIG. 4.

Securing means (44) are provided to secure the fluid providing means or tube (36) to a surface of the drum, preferably the inner surface (42), and to locate the first end (40) of the tube (36) adjacent the one end of the generating bank tube (16). In a preferred embodiment, the securing means (44) comprises a slotted plate (46) attached to an outer surface of the fluid providing means or tube (36) and adjustable means for securing the slotted plate (46) to the drum inner surface (42). The adjustable securing means comprises bolts (48) attached at one end by welding or other suitable means to the drum inner surface (42) and removably received at the other end through slots (50) in the slotted plate (46). This other end of the bolts (48) is provided with fasteners (52), such as nuts, washers and the like, to secure the slotted plate (46) to the bolts (48). Typically, the bolts (48) would be ½" diameter nominal size and the slotted plate (46) would be approximately ⅜" thick. The slotted plate (46) would extend substantially around the outer surface of the fluid providing means or tube (36) and would be attached thereto by welding or other suitable means.

Figure 3:
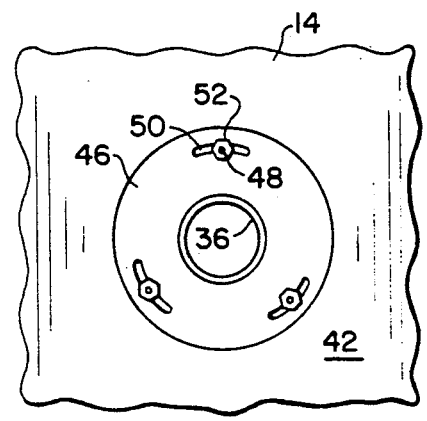
FIG. 3 is a sectional view of a portion of the apparatus as taken along line 3—3 of FIG. 2.

As shown in FIG. 3, which is a sectional view of a portion of the apparatus as taken along line 3—3 of FIG. 2, the securing means (44) would generally employ three sets of bolts (48) and accompanying fasteners (52) equally spaced around the periphery of the tube (36). The slots (50) allow for variations in positioning the tube (36) with respect to the one end of the generating bank tube (16). The slotted plate (46) itself would be attached by welding or other suitable means to the outer surface of the fluid providing means or tube (36) at a distance C (as shown in FIG. 4) of approximately 6" as measured from the first end (40) of the tube (36).

Referring to FIG. 2 again, the 2" OD fluid providing means or tube (36) would be approximately 18" long overall in the preferred embodiment, having a second end (54) located opposite of the first end (40) at a distance D of approximately 12" as measured from the point of attachment of the slotted plate (46) to the fluid providing means or tube (36). The fluid providing means or tube (36) provides fluid from or to the generating bank tube (16)) to the measurement area (38). Preferably, the measurement area (38) is provided within the fluid providing means or tube (36), inbetween the first end (40) and second end (54) of the tube (36). The wall thickness of the fluid providing means or tube (36), in one embodiment, is 0.270" thick when the outside diameter is approximately 2" OD.

Pressure sensing means (56) are provided for sensing pressure of the fluid within the measurement area (38). Advantageously, the pressure sensing means (56) comprises a pitot tube assembly (58) having upstream and downstream pressure taps (60, 62), respectively, for sensing the static and dynamic pressure of the fluid within the measurement area (38). It will be noted at this point that the designations of "upstream" and "downstream" are used as a matter of convenience, and not in any way to limit the invention to an application where the flow in the generating bank tube (16) is only in one direction. Indeed, it is a primary feature of the present invention that the direction of flow of the fluid within the fluid providing means or tube (36) can be determined. By its interconnection with the generating bank tube (16), the direction of flow therein is thus also determined.

The pitot tube assembly (58) is of known design, for example, a Cole Pitometer, a device widely used in the United States. The Cole Pitometer consists of two similar pitot tubes, one facing upstream and the other facing downstream. The tube facing upstream measures the impact, dynamic or stagnation pressure while the one facing downstream measures the pressure in the turbulent wake behind itself, which is considerably less than the true static pressure. However, these effects can be easily accounted for and corrected so that the measurements produced by the pitot tube assembly (58) are accurate and representative of the static and dynamic pressures of the fluid. For further details concerning the Cole Pitometer, the reader is referred to "Pitot Tube Practice", E. S. Cole, *Transactions of the ASME*, Vol. 57, p. 281, (1935), or any fluid mechanics text, such as *Elementary Fluid Mechanics*, 4th edition, Vennard, John Wiley & Sons (1961).

Once the pressures of the fluid are sensed by the pressure sensing means (56), these sensed pressures must be processed (and corrected, as mentioned earlier, if necessary) so as to provide information to an operator of the apparatus. Means are provided for transmitting the sensed pressures to pressure measuring means. Advantageously, the means for transmitting the sensed pressures comprises upstream and downstream impulse lines (64, 66), respectively, for conveying a portion of the fluid within the measurement area (38) to a pressure measuring means (68). The pressure measuring means can be a U-tube manometer, or a Bourdon gage. In a preferred embodiment, the pressure measuring means comprises an electrical pressure transmitter, operatively connected to the upstream and downstream pressure taps (60, 62) by means of the upstream and downstream impulse lines (64, 66), for producing electrical signals representative of the static and dynamic pressures. A power supply (70) would be provided to energize the pressure transmitter (68). The pressure transmitter (68) would provide, for example, a 4-20 mA signal which would be transmitted along lines (72, 74) to microprocessor-based calculating means (76). The calculating means (76) would receive the electrical signals representative of the static and dynamic pressures of the fluid and process and correct them, if necessary, to obtain the values of the pressures and of the fluid velocity in the measurement area (38). Since the measurement area (38) is directly connected to the one end of the generating bank tube (16), the velocity so determined is representative of that in the generating bank tube (16). The microprocessor-based calculating means (76) would also process the electrical signals representative of the static and dynamic pressures of the fluid and provide these signals, together with a signal representative of the fluid velocity, along a line (78) to display means (80). The display means could be a digital readout device or a strip chart recorder depending upon the form of display desired.

To calculate the fluid velocity as a function of the measured fluid pressures, the microprocessor based calculating means (76) calculates a difference between the pressure as measured at the upstream pressure tap (60) and that at the downstream pressure tap (62). Depending upon the magnitude of these two sensed pressures, the value corresponding to such a calculated difference could be positive, negative or zero. This is the basis for determining the direction of flow of the fluid in the measurement area (38), and thus in the generating bank tube (16), as a function of the sensed fluid pressures. The display means (80) would display not only the magnitude of the static and dynamic pressures, but also the difference therebetween which as indicated could have positive, negative or zero values. An operator knowing how this difference was calculated would thus be able to determine that a positive displayed value for this difference would indicate that flow in the tube (36), and thus in the generating bank tube (16), was impinging the upstream pressure tap (60). Similarly, a negative displayed value for this difference would indicate that flow in the tube (36), and thus in the generating bank tube (16), was impinging the downstream pressure tap (62). By knowing the orientation of the upstream and downstream pressure taps (60, 62), the direction of flow in the generating bank tube (16) can then be determined.

The pressure measuring means (68) used with the pitot tube assembly (58) could be a U-tube manometer or a Bourdon gauge. In such a case, an operator of the apparatus would visually read the pressures as measured and displayed thereon and perform a hand calculation to determine the velocity of the fluid in the measurement area (38) as a function of the pressures. Similarly, such a visual display by these devices, coupled with a knowledge of the orientations of the upstream and downstream pressure taps (60, 62), would provide an immediate indication of the direction of flow within the fluid providing means or tube (36), and thus in the generating bank tube (16).

Figure 5:
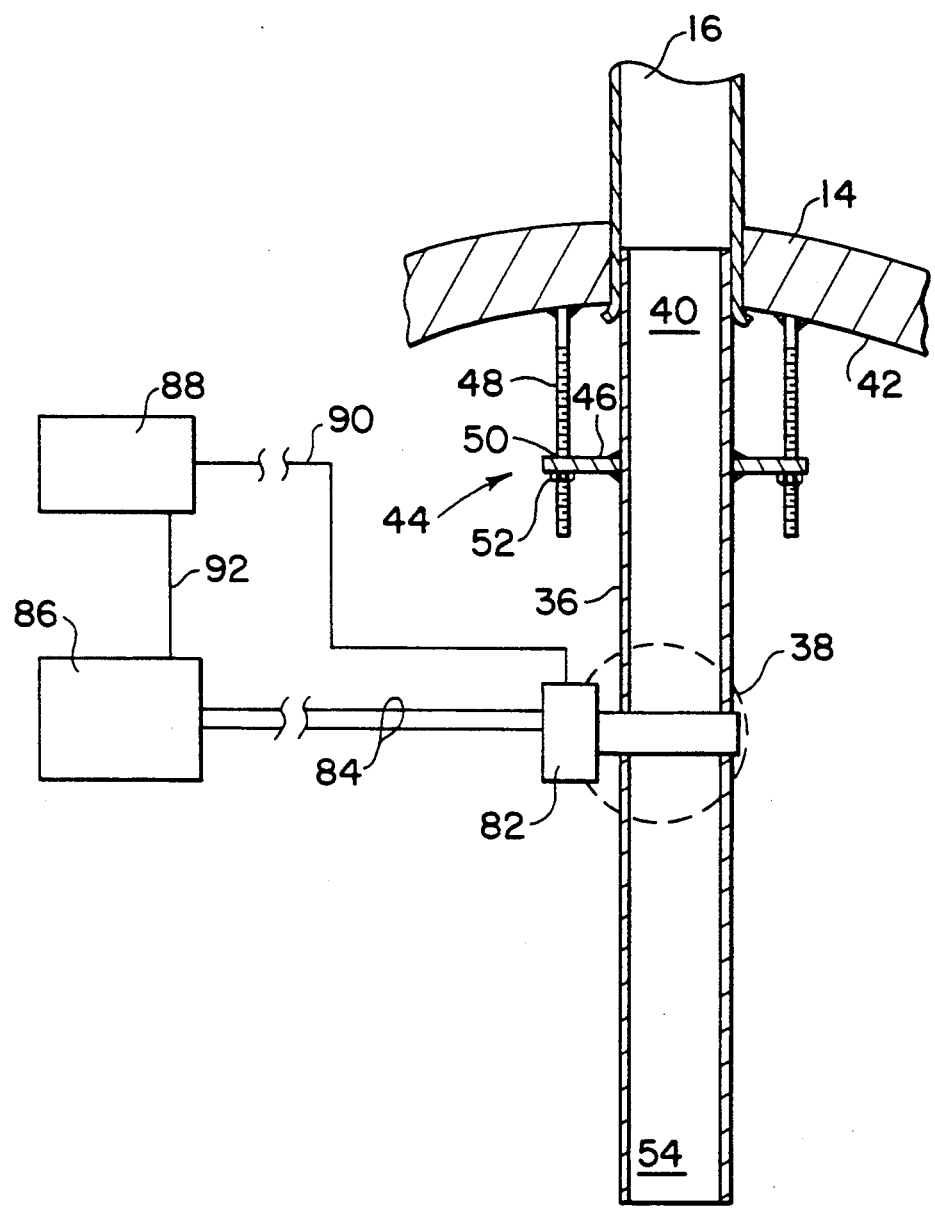
FIG. 5 is a schematic of an alternate embodiment of the invention.

Up to this point, measuring the fluid velocity in the measurement area (38) required sensing the pressure therein, measuring the pressure, and converting the measured pressure into a fluid velocity. There are various types of flowmeter means that can produce signals representative of the flow in a tube or conduit directly which could be adapted to the apparatus of the present invention. By way of example and not of limitation, an orifice or Venturi section, various fiber optic, vortex shedding, ultrasonic (Doppler) or other types of flowmeters could be employed. Such an arrangement is schematically shown in FIG. 5, wherein a flowmeter (82) is operatively disposed with respect to the fluid providing means or tube (36) so as to measure the fluid velocity in the measurement area (38). Signals produced thereby are conveyed via lines (84) to display means (86), for reading by an operator. Again, a power supply (88) would be provided in known fashion to energize the flowmeter (82) and display means (86) via lines (90, 92), respectively. Of course, as is true in any type of measurement application a major consideration (aside from cost) is to select a flowmeter that is capable of withstanding the temperatures and pressures involved while causing little or no disturbance in the fluid flow being measured.

It will thus be seen that the present invention allows an operator to measure the velocity of a fluid within a generating bank tube (16), and/or the direction of flow therein. Sizing of the fluid providing means or tube (36), and the selection and positioning of the pressure sensing means (56) therein would be done according to known fluid measurement principles. The present invention has the advantage of being able to measure the velocity of the fluid at the entrance (or exit) of the one end of the generating bank tube (16) where no heat absorption is being incurred by the fluid. The preferred embodiment places the apparatus of the present invention inside the lower mud drum (14), and routes the impulse lines (64, 66) to an externally located pressure measuring means (68). No special cooling of these impulse lines (64, 66) is required to maintain the accuracy of the measurement, since the measurement area (38) and the impulse lines are only exposed to the fluid temperature in the lower mud drum (14). This temperature is typically less than the saturation temperature in the upper steam drum (12) and therefore the need or additional cost of cooling the impulse lines (64, 66) is obviated.

While in accordance with the provisions of the statutes there has been illustrated and described herein specific embodiments of the invention, those skilled in the art will understand that changes may be made in the form of the invention covered by the following claims and that certain features of the invention may sometimes be used to advantage without a corresponding use of the other features. For example, while the present invention may be applied to new construction involving two-drum steam generators, the present invention could equally be applied to existing two-drum steam generators for purposes of analysis and experiment. Similarly, while the measurement area (38) has been shown located within the lower mud drum (14) it may be desirable to route the fluid providing means or tube (36) outside of the lower mud drum (14), locate the pressure sensing means externally of the lower mud drum (14), and then reroute the second end (54) of the fluid providing means or tube (36) back into the lower mud drum (14). Further, it may be possible and desirable to co-locate both the pressure measuring means (68) and the pressure sensing means (56) within the environment of the lower mud drum (14), shortening the impulse lines (64, 66) as necessary, and merely route only the lines (72, 74) to a position outside of the lower mud drum (14) where they would be connected to the microprocessor-based calculating means (76) and the display means (80). It is thus understood that such variations are the equivalent of the apparatus set forth in the following claims.

What is claimed as new and desired to be secured by Letters Patent of the United States is:

1. An apparatus for measuring the velocity of a fluid in a generating bank tube attached at one end to a drum of a boiler, comprising:
   means for providing fluid to a measurement area that is in fluidic communication with said generating bank tube and said drum, said fluid providing means including a tube having a first end located adjacent said one end of said generating bank tube and a second end located within said drum, said measurement area being located inbetween said first and second ends of said tube;
   means for securing said fluid providing means to an inner surface of said drum;
   means for sensing pressure of the fluid within said measurement area; and
   means for determining the velocity of the fluid in said measurement area, and thus in said generating bank tube, as a function of said sensed fluid pressure.

2. An apparatus according to claim 1, wherein said one end of said generating bank tube has an inside diameter (ID), which closely receives an outside diameter (OD) of said first end of said tube so as to prevent fluid passing between said ID and said OD.

3. An apparatus according to claim 2, wherein said OD of said first end of said tube tapers radially inwardly and towards said first end of said tube to facilitate being closely received by said ID of said one end of said generating bank tube.

4. An apparatus according to claim 3, wherein said first end of said tube is inserted a distance in the range of approximately 1" to 3" into said one end of said generating bank tube, as measured from an inner surface of said drum.

5. An apparatus according to claim 3, wherein said outside diameter of said tube tapers radially inwardly from approximately 2" to approximately 1.5" OD.

6. An apparatus according to claim 1, wherein said securing means comprises a slotted plate attached to an outer surface of said fluid providing means and adjustable means for securing said slotted plate to said drum inner surface.

7. An apparatus according to claim 6, wherein said adjustable securing means comprises bolts, attached at one end to said drum inner surface and removably received at the other end through the slots in said plate, said other end of said bolts being provided with fasteners to secure said slotted plate to said bolts.

8. An apparatus according to claim 7, wherein said bolts are ½" bolts and said slotted plate is approximately ⅜" thick and extends substantially around said outer surface of said fluid providing means.

9. An apparatus according to claim 1, wherein said securing means is attached to an outer surface of said fluid providing means at a distance approximately 6" from said first end of said tube.

10. An apparatus according to claim 9, wherein said tube has a second end located opposite of said first end of said tube at a distance approximately 12" from said securing means.

11. An apparatus according to claim 1, wherein said fluid providing means comprises a tube having a first end, a second end, an outside diameter (OD) of approximately 2" OD and a wall thickness of approximately 0.270", said tube being approximately 18" long and wherein said measurement area is located within said tube at a distance approximately 9" from said second end of said tube.

12. An apparatus according to claim 1, wherein said pressure sensing means comprises a pitot tube assembly having upstream and downstream pressure taps for sensing the static and dynamic pressure of the fluid within said measurement area, and pressure measuring means, operatively connected to said pressure taps, for producing electrical signals representative of said static and dynamic pressures.

13. An apparatus according to claim 12, wherein said fluid velocity determining means comprises a microprocessor-based calculating means, operatively connected to said pressure measuring means, for calculating the velocity of the fluid as a function of said static and dynamic pressures and producing an electrical signal representative thereof.

14. An apparatus to claim 13, further including display means, operatively connected to said microprocessor-based calculating means, for receiving said electrical signals representative of said static and dynamic pressures and of said fluid velocity and displaying same as values for reading by an operator.

15. An apparatus for measuring the velocity of a fluid in a generating bank tube attached at one end to a drum of a boiler, comprising:
means for providing fluid to a measurement area, located within said drum, that is in fluidic communication with said generating bank tube and said drum;
means for securing said fluid providing means to an inner surface of said drum;
means for sensing pressure of the fluid within said measurement area; and
means for determining the fluid velocity in said measurement area, and thus in said generating bank tube, as a function of said sensed fluid pressure.

16. An apparatus according to claim 15, wherein said pressure sensing means includes a pitot tube assembly having upstream and downstream pressure taps for sensing the static and dynamic pressure of the fluid within said measurement area.

17. An apparatus according to claim 16, further including means for transmitting said pressure from said measurement area to pressure measuring means.

18. An apparatus according to claim 17, wherein said transmitting means comprises impulse lines connected to said upstream and downstream pressure taps for conveying a portion of the fluid within said measurement area to said pressure measuring means.

19. An apparatus according to claim 17, wherein said pressure measuring means is a Bourdon gage, operatively connected to said pressure taps, for displaying said static and dynamic pressures of the fluid within said measurement area for reading by an operator.

20. An apparatus according to claim 17, wherein said pressure measuring means is a U-tube manometer, operatively connected to said pressure taps, for displaying said static and dynamic pressures of the fluid within said measurement area for reading by an operator.

21. An apparatus according to claim 17, wherein said pressure measuring means comprises a pressure transmitter, operatively connected to said pressure taps, for producing electrical signals representative of said static and dynamic pressures of the fluid within said measurement area.

22. An apparatus for determining the direction of flow of a fluid in a generating bank tube attached at one end to a drum of a boiler, comprising:
means for providing to a measurement area that is in fluidic communication with said generating bank tube and said drum, said fluid providing means including a tube having a first end located adjacent said one end of said generating bank tube and a second end located within said drum, said measurement area being located inbetween said first and second ends of said tube;
means for sensing pressure of the fluid within said measurement area; and
means for determining the direction of flow in said measurement area, and thus in said generating bank tube, as a function of said sensed fluid pressure.

23. An apparatus according to claim 22, wherein said pressure sensing means comprises a pitot tube assembly having upstream and downstream pressure taps.

24. An apparatus according to claim 23, further including a Bourdon gage, operatively connected to said pressure taps, for displaying static and dynamic pressures of the fluid at said taps for reading by an operator.

25. An apparatus according to claim 23, further including a U-tube manometer, operatively connected to said pressure taps, for displaying static and dynamic pressures of the fluid at said taps for reading by an operator.

26. An apparatus according to claim 23, further including pressure measuring means, operatively connected to said pressure taps, for producing electrical signals representative of static and dynamic pressures of the fluid at said taps.

27. An apparatus according to claim 26, further including means for transmitting said electrical signals to a microprocessor-based calculating means for calculating the velocity of the fluid as a function of said static and dynamic pressure and producing electrical signals representative thereof.

28. An apparatus according to claim 27, wherein said microprocessor-based calculating means calculates differences between said static and dynamic pressures and produces electrical signals representative thereof, and wherein said differences can have positive, negative or zero values, and further including display means for displaying said signals representative of said pressures, said velocity of the fluid and differences in pressure for reading by an operator.

29. An apparatus according to claim 28, wherein a positive displayed value for the difference of the pressure measured by said upstream pressure tap minus the pressure measured by said downstream pressure tap is an indication that flow in said generating bank tube is impinging said upstream pressure tap, and wherein a negative displayed value for the difference of the pressure measured by said upstream pressure tap minus the pressure measured by said downstream pressure tap is an indication that flow in said generating bank tube is impinging said downstream pressure tap.

30. An apparatus for measuring the velocity of a fluid in a generating bank tube attached at one end to a drum of a boiler, comprising:

means for providing fluid to a measurement area that is in fluidic communication with said generating bank tube and said drum, said fluid providing means including a tube having a first end located adjacent said one end of said generating bank tube and a second end located within said drum, said measurement area being located inbetween said first and second ends of said tube;

means for securing said fluid providing means to an inner surface of said drum; and flowmeter means, operatively disposed with respect to said fluid providing means, for measuring the velocity of the fluid in said measurement area, and thus in said generating bank tube.

* * * * *